(12) United States Patent
Yahagi

(10) Patent No.: US 6,477,159 B1
(45) Date of Patent: Nov. 5, 2002

(54) MOBILE COMMUNICATION SYSTEM AND A METHOD THEREOF

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/347,453

(22) Filed: Jul. 6, 1999

(30) Foreign Application Priority Data

Jul. 6, 1998 (JP) .......................................... 10-204272
Jan. 22, 1999 (JP) .......................................... 11-014081

(51) Int. Cl.[7] .............................................. H04B 7/216
(52) U.S. Cl. ...................................... 370/335; 370/342
(58) Field of Search ................................ 455/437, 442, 455/434, 450, 452, 511; 370/332, 335, 342; 375/140, 149

(56) References Cited

U.S. PATENT DOCUMENTS 5,267,261 A * 11/1993 Blakeney et al. ........... 370/332
6,233,454 B1 * 5/2001 Sato ............................ 455/436
6,263,207 B1 * 7/2001 Kito ............................ 455/452

OTHER PUBLICATIONS

European Search Report, dated Jul. 7, 2000.

* cited by examiner

Primary Examiner—Dwayne Bost
Assistant Examiner—Lewis G. West
(74) Attorney, Agent, or Firm—McGinn & Gibb, PLLC

(57) ABSTRACT

A mobile communication system and its method, which uses a discrimination code specific to a mobile terminal as an discriminating signal for both of reverse channel and forward channel between a mobile terminal and a mobile communication network, are provided. A mobile terminal includes a predetermined modulating and demodulating code generator, and makes a call connection request through an access channel based on broadcast information from a base station. The call connection request contains an equipment number of the mobile terminal, and based on this equipment number, the network side device discriminates a code corresponding to this mobile terminal. The base station modulates and demodulates a reverse channel and forward channel signals based on the discriminated code.

14 Claims, 5 Drawing Sheets

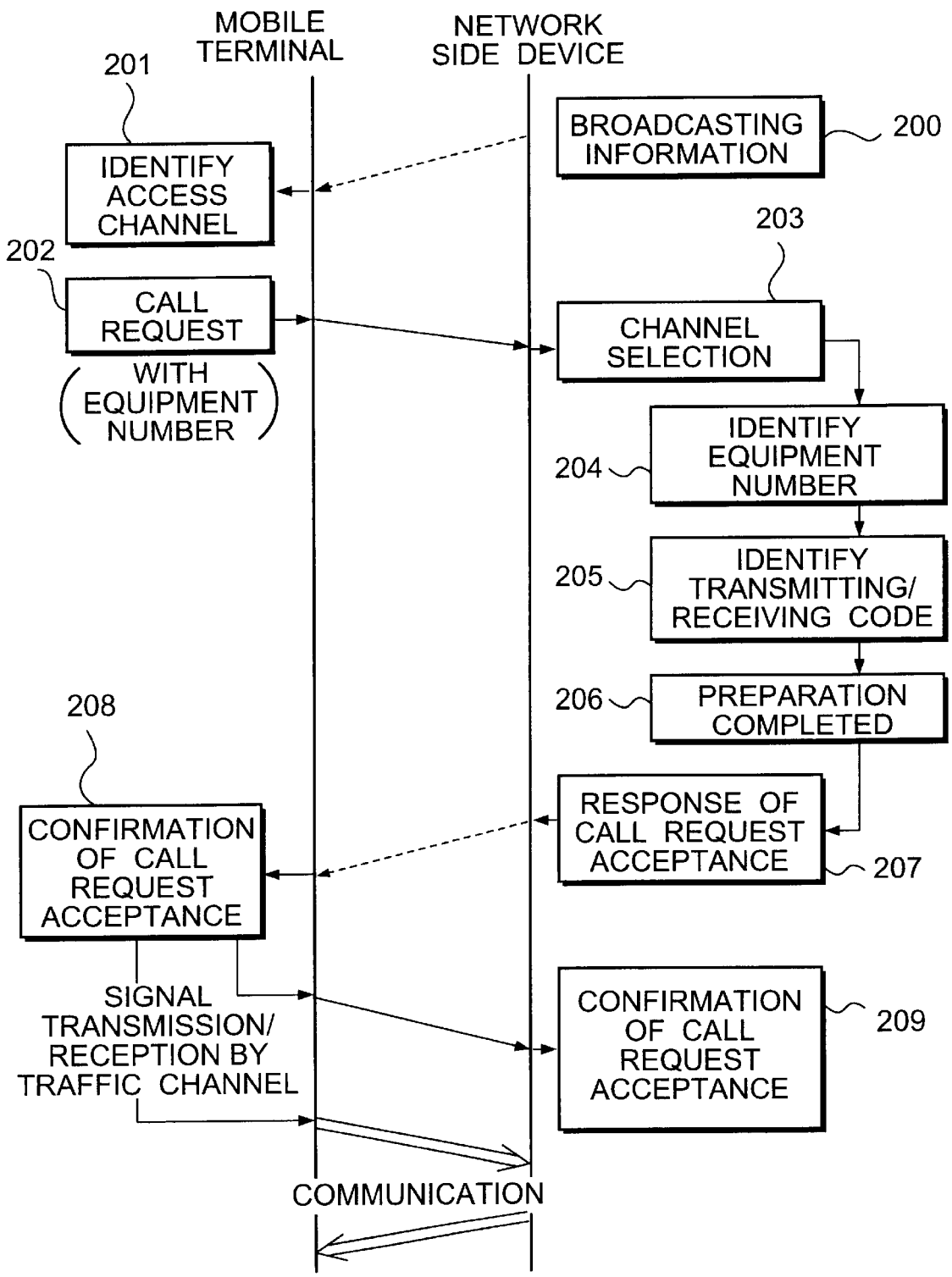

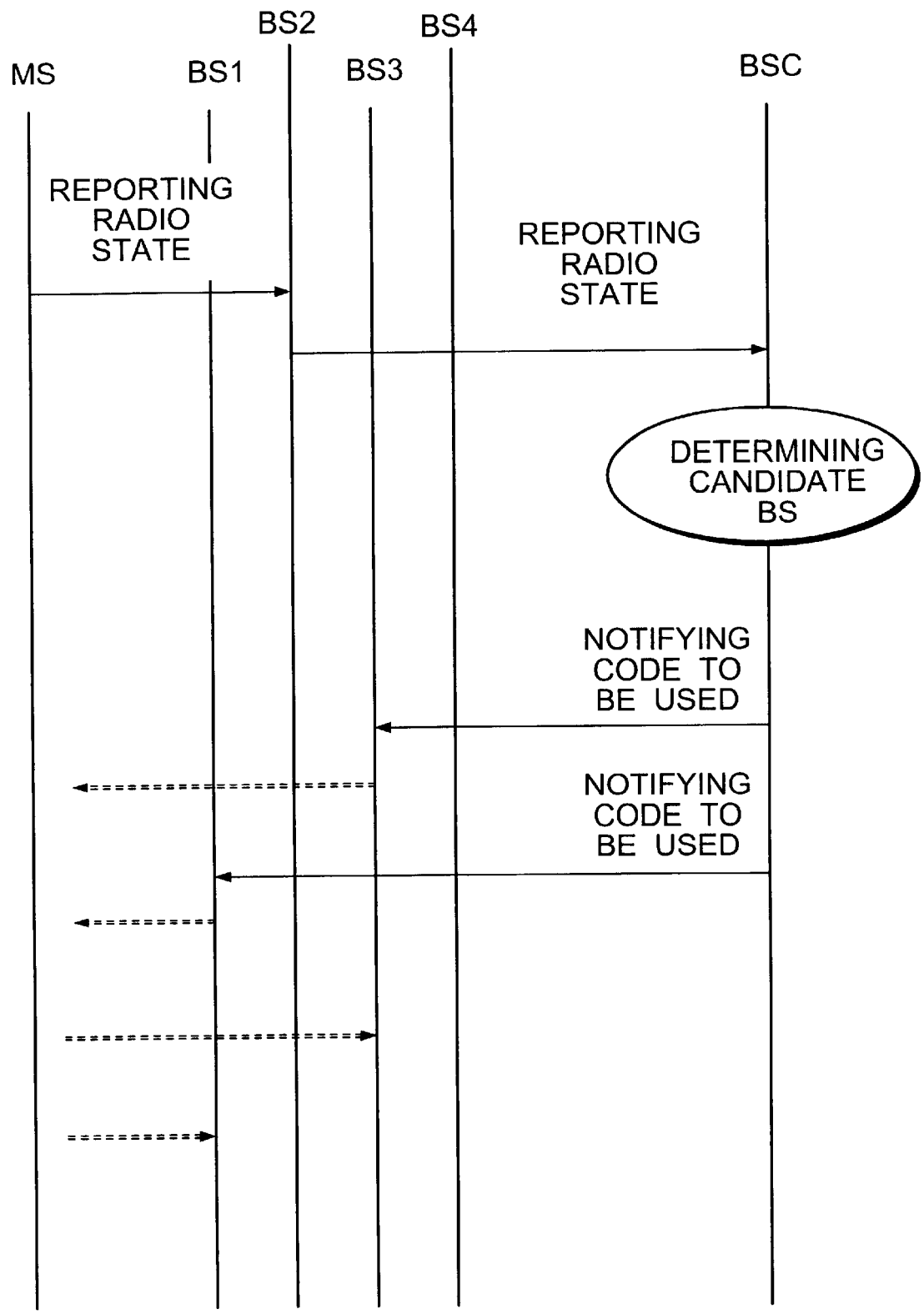

MOBILE COMMUNICATION SYSTEM AND A METHOD THEREOF

BACKGROUND OF THE INVENTION

1. Field of the Invention

The present invention relates to a mobile communication system and a mobile communication method. More specifically, the invention relates to a mobile communication system and a mobile communication method where a discrimination code specific to a mobile terminal is used as a discrimination code for a traffic channel of a forward channel and reverse channel transmitted between the mobile terminal and a mobile communication network.

2. Description of the Related Art

A well known system used in a mobile communication network composed of a mobile switching center, a base station control equipment and base stations is a mobile communication system which allows a mobile terminal to perform communications while moving in a service area provided by each base station by being connected through a radio channel.

Also, known as systems for multiplexing a radio channel between each base station and a plurality of mobile terminal so as to provide a multi-channel form are FDMA (Frequency Division Multiple Access), TDMA (Time Division Multiple Access) and CDMA (Code Division Multiple Access) for spectrum-spreading an information bit to be communicated based on a diffusing code pattern composed of several tens of bits to several thousands of bits and then multiplexing the information bit in an identical frequency carrier wave.

In such various multiple access systems, each multiplexed channel is discriminated based on a time slot in the case of the TDMA system; based on a frequency in the case of the FDMA system (based on a frequency hopping pattern if a frequency hopping system is employed); and based on a diffusing code pattern in the case of the CDMA system, and even if a number of communications exist under the environment of the same time, the same space and the same frequency, individual communications are separated from others and thus communications can be carried out without being influenced by others.

For each of channels for performing such individual communications, an agreement is reached between a mobile terminal and a base station before communications are started, and thereafter communications are continued properly according to a mutual agreement under an existing state. For example, for hand-over processing carried out when a mobile terminal has moved from one base station to another and continues communications, a channel for performing communications with a new base station is newly decided as occasion demands, and the mobile terminal continues communications with the new base station of moving destination by using the decided channel.

A prior art of such a mobile communication system will be described by taking an example of IS-95 specification, which prescribes for a cellular mobile communication system using the CDMA system in North America.

For a so-called reverse channel, radio signals transmitted by a mobile terminal and received by a base station, used for separating from a reverse channel signal of another mobile terminal, modulation is performed by using a diffusing code based on an equipment number specifically allocated to each mobile terminal. This equipment number is a 32 bit number allocated by a terminal manufacturer to each mobile terminal and includes a manufacturer discrimination code and a serial number for each manufacturer, and this 32 bit number is a unique number. A diffusing code generated based on this equipment number has variations of $2^{32}$ (4.2 billion).

On the other hand, a diffusing code for modulation performed for a forward channel, radio signals transmitted by a base station and received by a mobile terminal, is as follows. First, for means for discriminating each of a plurality of base stations existing in the mobile communication network, a group of 512 obtained by shifting PN (Pseudo Noise, pseudo random number group: 32768 chip length) by 64 chips is used as each base station signal diffusing code, and for means for separating signals of different mobile terminals in the same base station from one another, Walsh code is used. In other words, a signal transmitted from the base station to the mobile terminal is diffused and modulated by using these two kinds of codes (base station signal diffusing code, and Walsh code).

For performing communications between the mobile terminal and the base station by the CDMA system, received signals respectively transmitted therefrom must be oppositely-diffused for demodulation, and diffusing codes used for communications must be notified to each other beforehand. Thus, its method will be described.

First, after having entered a service area of a certain base station, the mobile terminal receives broadcast information of various kinds from the base station through a common channel, for which diffusing codes are predetermined by the system. Since the broadcast information contains diffusing code information of an access channel used for accessing the base station, the mobile terminal which requests call connection transmits a call connection request signal diffused and modulated based on the diffusing code thereof. In other words, a call connection request is made through the access channel. Since the call connection request signal contains an equipment number of the mobile terminal, the base station which has been on standby and received the call connection request from the mobile terminal through the access channel can be notified of a diffusing code used by the mobile terminal for a reverse channel based on the equipment number by referring to a data base of the base station control equipment or the mobile switching center.

Then, the base station control equipment or the mobile switching center selects a traffic channel to be used by the base station from resources, and reports a diffusing code (base station signal diffusing code and Walsh code) corresponding to the traffic channel allocated to the requested call from the base station to the mobile terminal. Accordingly, in the CDMA system, the diffusing code of the mobile terminal and the base station used for communications are notified to each other, and receiving preparations are made.

Furthermore, in hand-over processing for changing the base station to another during communications, the mobile terminal is notified of a diffusing code used for a forward channel of a base station as a hand-over destination, which is allocated by the base station control equipment or the mobile switching center, and communications with the base station as the hand-over destination are also started. After the mobile terminal has moved sufficiently away from the base station as a hand-over origin, the communications with this base station are cut off to perform communications only with the base station as the hand-over destination. Such soft hand-over processing is a characteristic art of the CDMA system.

As described above, a diffusing code for a reverse channel transmitted from the mobile terminal is specific to each mobile terminal, whereas a diffusing code for a forward channel transmitted from the base station to the mobile terminal is different for each base station. Thus, for switching of a radio channel following the movement of the mobile terminal from a certain base station area to another base station area, switching of a diffusing code for a reverse channel signal is not necessary, but regarding a diffusing code for a forward channel, it is necessary to select a forward channel diffusing code for a base station as an entering destination, allocate the diffusing code and notify the mobile terminal of the same.

Also, in the mobile terminal, it is necessary to receive traffic channel information used with a new base station for each movement between base station areas and form a speech channel which uses a new diffusing code.

The above processing needs operations of channel selecting, message editing, message transmitting and message transmission confirmation receiving to the network side device which includes the base stations, the base station control equipment and the mobile switching center, and operations of message receiving, message confirming, message transmission confirmation transmitting and speech channel forming to the mobile terminal, and thus from a system standpoint, influence of processing capability is given.

Therefore, in the conventional mobile communication system, since it was necessary to perform, for each movement of the mobile terminal between the base station areas, operations of message transmitting for specifying a diffusing code between the mobile terminal and the base station, confirming of transmission thereof, speech channel forming based on a new diffusing code, and so on, there was a problem of a load placed on processing capability. Especially, when the mobile terminal made repeated back and forth movement between the base station areas while performing packet communications, even if no transmitted burst data existed, only messages for channel allocation were passed around, which necessitated additional burdensome processing. Thus, a processing load placed in addition to the operations purely for communication purposes was a problem.

SUMMARY OF THE INVENTION

The present invention provides a mobile communication system and a mobile communication method where a discrimination code specific to a mobile terminal is used as a discrimination code for each of traffic channels of reverse channel and forward channel transmitted between the mobile terminal and a mobile communication network. The invention provides a mobile communication system and a mobile communication method, which enable the mobile terminal to conscientiously use the same channel without switching to a new channel even during a hand-over operation.

The present invention provides a mobile communication system and a mobile communication method, which can eliminate, in the case of the CDMA system, the necessity of message transmitting and receiving between a base station and a mobile terminal following switching of a diffusing code by using a mobile diffusing code as a diffusing code used for a traffic channel of a forward channel transmitted from the base station to the mobile terminal like that for a traffic channel of a reverse channel, and reduce a load for the above processing.

In the mobile communication system of the present invention for performing communications between a mobile terminal and a mobile communication network including a plurality of base stations and a base station control equipment, the mobile terminal includes a call connection requesting part for transmitting a call connection request signal through a predetermined control channel by adding specific information provided for the mobile terminal; a transmitting part for transmitting signals of a reverse channel based on a discrimination code specified by the specific information provided for the mobile terminal; and a receiving part for receiving signals of a forward channel based on a discrimination code specified by the specific information provided for the mobile terminal. The mobile communication network includes a translating part for translating the specific information provided for the mobile terminal, which is contained in the call connection request signal received through the control channel, and extracting a discrimination code for specifying each of the reverse channel and forward channel for the mobile terminal; a transmitting part for transmitting signals based on the discrimination code for specifying the forward channel, which is extracted by the translating part; and a receiving part for receiving signals based on the discrimination code for specifying the reverse channel, which is extracted by the translating part.

The mobile terminal further includes a monitoring part for measuring, based on information regarding each of the base stations adjacent to one another, which is notified beforehand, a receiving level of radio signals emitted from each of the adjacent base stations, and then reporting a measured result to the base station. The mobile communication network further includes a hand-over control part for notifying a base station of the discrimination codes for respectively specifying the reverse channel and forward channels used for communications with the mobile terminal, the base station being one where a receiving level of radio signals emitted from each of the adjacent base stations, which is reported from the mobile terminal, reaches a predetermined value, and then instructing starting of communications with the mobile terminal.

In the system for performing communications by the CDMA system, the mobile terminal includes a transmitting part for diffusing and modulating transmitted signals of a reverse channel going from the mobile terminal to a base station based on transmission diffusing code which is specified by specific information provided for the mobile terminal; and a receiving part for oppositely-diffusing and demodulating received signals of a forward channel going from a base station to the mobile terminal based on a receiving oppositely-diffusing code which is specified by the specific information provided for the mobile terminal. The mobile communication network includes a translating part for translating the specific information provided for the mobile terminal, which is contained in a call connection request signal received through a control channel, and extracting a diffusing code used for each of the reverse channel and forward channels for the mobile terminal; a transmitting part for diffusing and modulating transmitted signals based on the transmission diffusing code of the forward channel which is extracted by the extracting means; and a receiving part for oppositely-diffusing and demodulating received signals based on the receiving oppositely-diffusing code of the reverse channel which is extracted by the translating part.

In the mobile communication method of the present invention for performing communications between a mobile terminal and a mobile communication network including a plurality of base stations and a base station control equipment, the mobile terminal includes the followings:

(1) transmitting a call connection request signal through a predetermined control channel by adding specific information provided for the mobile terminal;

(2) transmitting signals of a reverse channel going from the mobile terminal to each of the base stations based on a discrimination code which is specified by the specific information provided for the mobile terminal;

(3) receiving signals of a forward channel going from each of the base stations to the mobile terminal based on a discrimination code which is specified by the specific information provided for the mobile terminal; and (4) measuring, during communications, a receiving level of radio signals emitted from each of the adjacent base stations based on information regarding the base station, which is notified beforehand, and then reporting a measured result to the base station.

The method in the mobile communication network includes the followings:

(1) translating the specific information provided for the mobile terminal, which is contained in the call connection request signal received through the control channel, and extracting a discrimination code for specifying each of the reverse channel and forward channels for the mobile terminal;

(2) transmitting signals based on the extracted discrimination code which specifies the forward channel;

(3) receiving signals based on the extracted discrimination code which specifies the reverse channel; and (4) notifying a base station of the discrimination codes for respectively specifying the reverse channel and forward channels for the mobile terminal, the base station being one where a receiving level of radio signals emitted from each of the adjacent base stations, which is reported from the mobile terminal, reaches a predetermined value, and then instructing starting of communications with the mobile terminal.

In the system for performing communications by the CDMA system, the mobile terminal of the mobile communication method of the present invention includes the followings:

(1) transmitting a call connection request signal through a predetermined control channel by adding specific information provided for the mobile terminal;

(2) diffusing and modulating transmitted signals of a reverse channel going from the mobile terminal to a base station based on a transmission diffusing code which is specified by the specific information provided for the mobile terminal;

(3) oppositely-diffusing and demodulating received signals of a forward channel going from a base station to the mobile terminal based on a receiving oppositely-diffusing code which is specified by the specific information provided for the mobile terminal; and (4) measuring, during communications, a receiving level of radio signals emitted from each of the adjacent base stations based on information regarding the adjacent base station, which is notified beforehand, and then reporting a measured result to the base station.

The method in the mobile communication network includes the followings:

(1) translating the specific information provided for the mobile terminal, which is contained in the call connection request signal received through the control channel, and extracting a diffusing code used for each of the reverse channel and forward channel for the mobile terminal;

(2) diffusing and modulating transmitted signals based on the extracted transmission diffusing code of the forward channel;

(3) oppositely-diffusing and demodulating the extracted receiving oppositely-diffusing code of the reverse channel; and (4) notifying a base station of the reverse channel oppositely-diffusing code and the forward channel diffusing code for the mobile terminal, the base station being one where a receiving level of radio signals emitted from each of the adjacent base stations, which is reported from the mobile terminal, reaches a predetermined value, and then instructing starting of communications with the mobile terminal.

BRIEF DESCRIPTION OF THE DRAWINGS

FIG. 2 is an operational sequence view illustrating an operation for deciding a diffusing code for each of reverse channel and forward channels based on an equipment number of a mobile terminal, which is performed in the mobile communication system of the present invention.

FIG. 3(A) is a device connection constitutional example of the CDMA multiplex communication system.

FIG. 5 is an operational sequence view illustrating a procedure for transmitting a diffusing code used for communication connection with another base station during the hand-over operation.

DETAILED DESCRIPTION OF PREFERRED EMBODIMENTS

Figure 1:
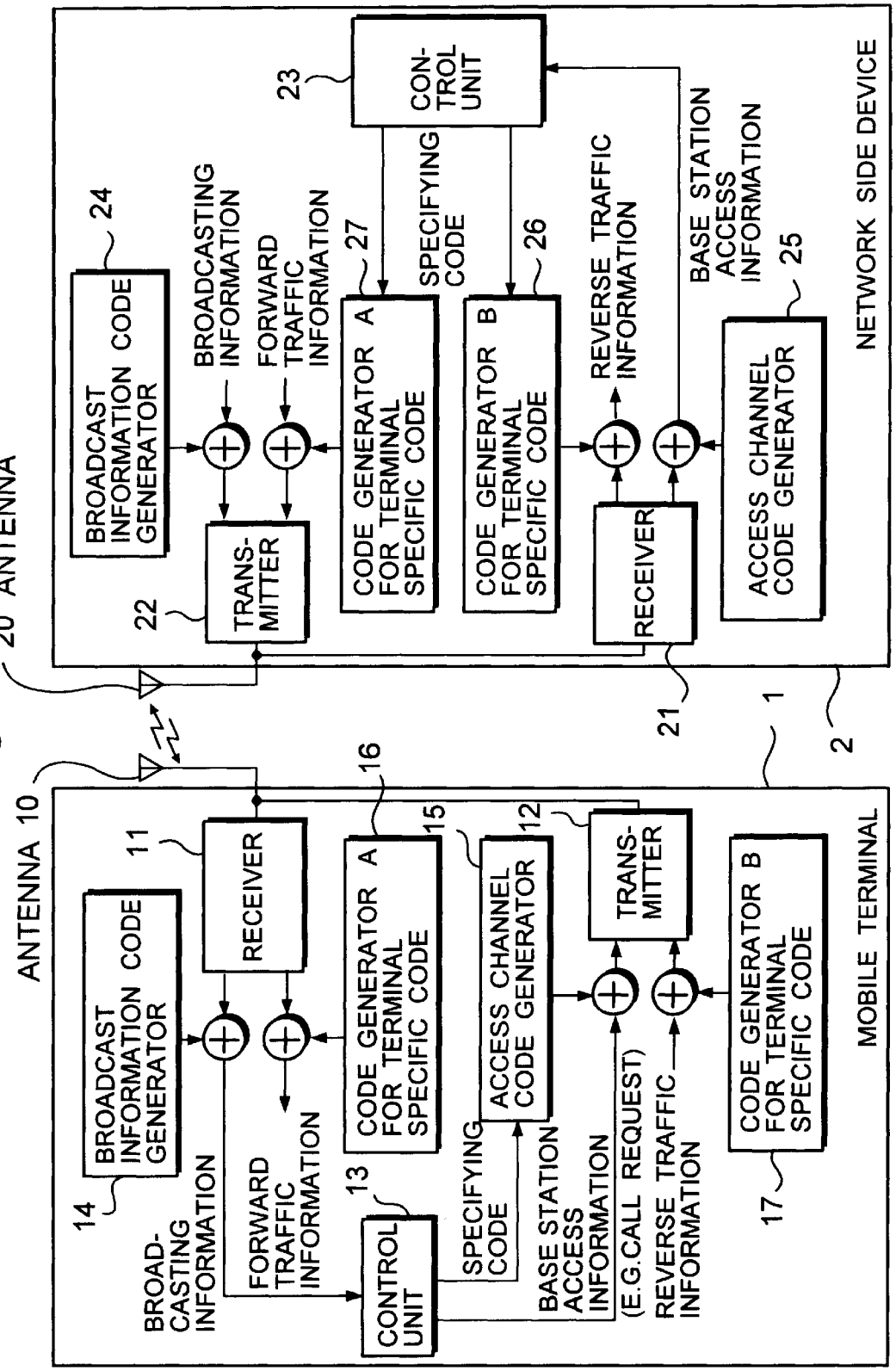
FIG. 1 is a block diagram showing a constitutional example of a mobile communication system of the present invention.

FIG. 1 is a block diagram showing a constitutional example of a mobile communication system of an embodiment of the present invention. A mobile terminal 1 includes a receiver 11 for receiving, through an antenna 10, a signal from a network side device 2 which includes a base station, a broadcast information code generator 14 for generating a broadcast information code predetermined corresponding to a broadcast channel which receives broadcast information from the base station, and a code generator A for terminal specific code 16 for generating a terminal specific code (e.g., diffusing code such as a PN signal or the like) corresponding to a forward channel. For a signal received by the receiver 11, broadcast information or forward channel traffic information is oppositely-diffused and demodulated by using an oppositely-diffusing code generated by each code generator. The mobile terminal 1 further includes a code generator B for terminal specific code 17 for generating a terminal specific code which is used for modulating a reverse channel signal to be transmitted, an access channel code generator 15 for modulating access channel information to be transmitted, a transmitter 12 for transmitting, through the antenna 10, a signal which has been diffused and modulated by using a diffusing code generated by each code generator, and a control unit which is in charge of control for the entire mobile terminal 1.

The network side device 2, specifically the base station includes a broadcast information code generator 24 for generating a broadcast information code which is used for modulating a signal to be transmitted through a broadcast channel, a code generator A for terminal specific code 27 for generating a terminal specific code which is used for modulating a forward channel signal to be transmitted, and a transmitter 22 for transmitting, through an antenna 20, a signal which has been diffused and modulated by using a diffusing code generated by each code generator. The base station further includes a receiver 21 for receiving signals transmitted by the mobile terminal 1 through the antenna 20, an access channel code generator 25 for generating an access channel code predetermined corresponding to an access channel which receives access information from the mobile terminal 1, and a code generator B for terminal specific code 26 for generating a terminal specific code corresponding to a reverse channel. For a signal received by the receiver 21, access information or traffic information is oppositely-diffused and demodulated by using an oppositely-diffusing code generated by each code generator. Further, the network side device 2 comprises a control unit 23 which is equivalent to a base station control equipment or a mobile switching center.

With the above constitution, in the mobile terminal 1 and the network side device 2 (base station), a signal transmitted from the mobile terminal to the base station and a signal transmitted from the base station to the mobile terminal are respectively diffused by using a terminal discrimination code specific to the mobile terminal 1.

FIG. 2 is a flow chart showing flows of a control signal transmitted and received between the mobile terminal 1 and the network side device 2 in the mobile communication system of the present invention and a control operation of each device before call setting.

Described next by referring to FIGS. 1 and 2 is an operation of the present invention which uses a discrimination code specific to the mobile terminal as a discrimination code for a traffic channel of a reverse channel and forward channel signal transmitted and received between the mobile terminal and a mobile communication network.

The base station comprised in the network side device 2 always informs, by using its own broadcast channel, the mobile terminal 1 located in a base station's own service area of information necessary for call control or the like. Since a diffusing code used for this information channel is predetermined, a mobile terminal moving into the service area of the base station or a mobile terminal switched ON in this service area is enabled to receive broadcast information by using a diffusing code generated by the broadcast information code generator 14. Accordingly, upon having received broadcast information (200) transmitted from the base station, the mobile terminal discriminates, by the control unit 13, access channel information necessary for performing communications with the base station (201).

The mobile terminal 1, which makes a calling request, transfers diffusing code information of the discriminated access channel from the control unit 13 to the access channel code generator 15, modulates a call connection request signal (202) based on the diffusing code of the access channel, and then transmits the modulated signal to the base station. This call connection request signal contains an equipment number of the mobile terminal.

The base station is on standby for receiving a control signal from the mobile terminal through the access channel, and after receiving the call connection request, the base station transfers, for obtaining channel allocation of a traffic channel used for communications, the call connection request to the control unit 23 as the base station control equipment or the mobile switching center (203). The control unit 23 retrieves the equipment number of the mobile terminal contained in the call connection request in a database, and discriminates a mobile diffusing code stored corresponding to the equipment number for each of reverse and forward channels (204, 205). The discriminated diffusing code specific to the mobile terminal is notified from the control unit 23 to the base station, a mobile diffusing code for each of reverse/forward channels is set in each of the receiving code generator B for terminal specific code 26 and the transmitting code generator A for terminal specific code 27 which are included in the base station, and then communication preparation is completed (206).

After completion of the communication preparation, the base station transmits a signal for reporting call connection reception through the broadcast channel to the mobile terminal 1 (207). Since this signal for reporting the call connection reception contains the equipment number of the mobile terminal which has made the calling request, only the mobile terminal having the above equipment number recognizes this signal (208). After having been informed of the completed preparation for receiving a call in the network side device, the mobile terminal transmits receiving confirmation of the call connection reception report through the access channel to the base station (209).

With the above control operation, preparation is performed for starting communications between the mobile terminal 1 and the network side device 2, and the communications are executed through the traffic channels. At this time, in the mobile terminal side, the diffusing code predetermined for the mobile terminal is used for transmitting and receiving and, in the network side device, the diffusing code specific terminal equipment which was discriminated during the call setting is also used. Accordingly, with the mobile communication system of the present invention, even in the forward channel for transmission from the base station to the mobile terminal, communications can be performed by using the diffusing code specific to the mobile terminal which makes a call connection request.

Figure 3A:
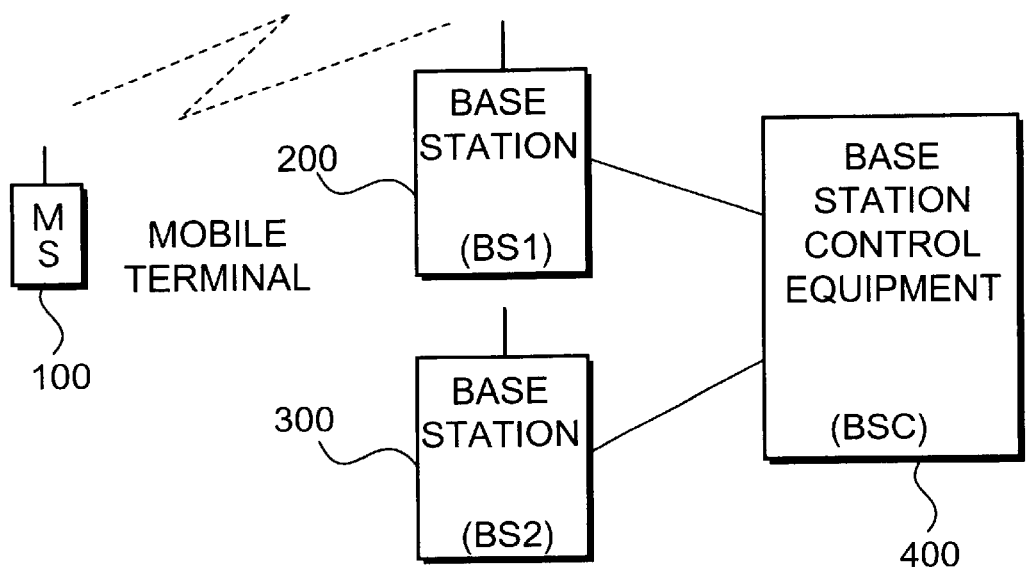
FIGS. 3(A) and (B) are conceptual views showing a state where each signal transmitted and received between the mobile terminal and a base station is diffused by using a terminal specific code.
Figure 3B:
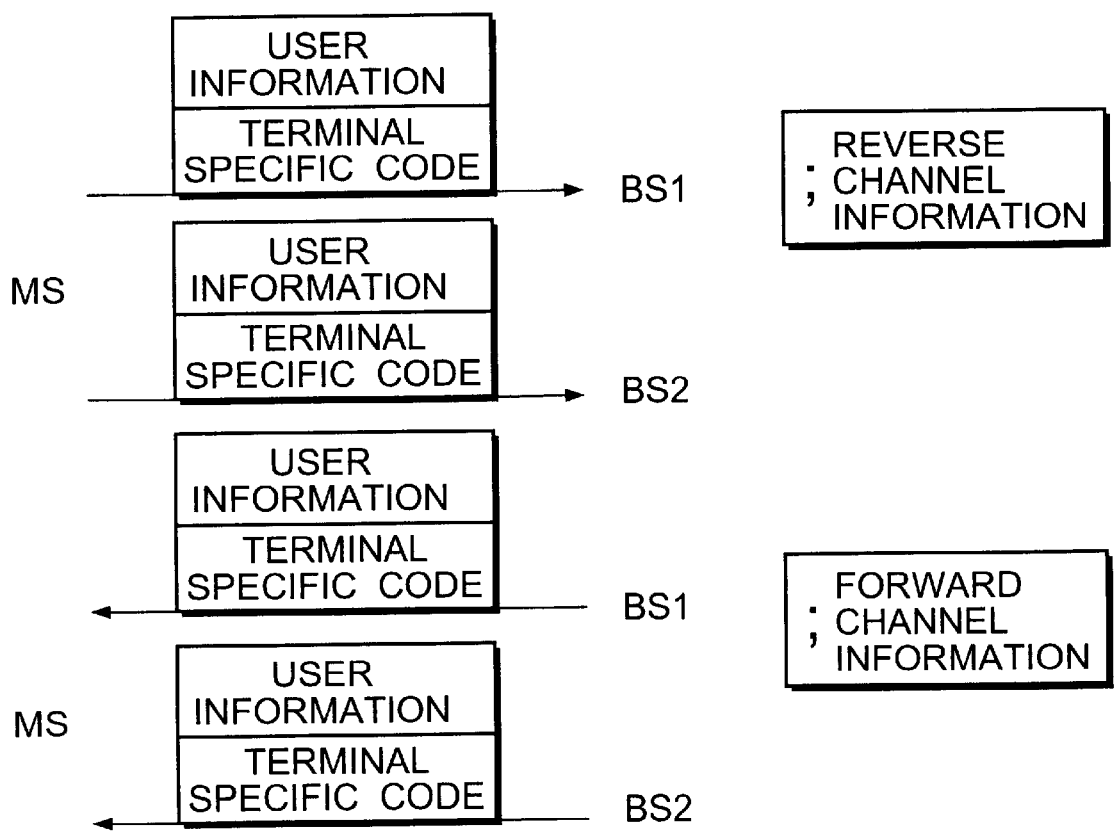
FIG. 3(B) is an explanatory drawing showing reverse channel information and forward channel information modulated based on the diffusing code specific to the mobile terminal.

FIG. 3(A) is a device connection constitutional example of the above CDMA multiplex communication system, and FIG. 3(B) is an explanatory drawing showing reverse channel information and forward channel information modulated based on the diffusing code specific to the mobile terminal.

Each of signals transmitted from the base station (BS1) 200 and the base station (BS2) 300 to the mobile terminal 100 is diffused and modulated by using the diffusing code specific to the mobile terminal 100 as a communication opponent. Accordingly, the mobile terminal 100 always performs signal modulation (spread spectrum modulation) and demodulation (spread spectrum demodulation: opposite diffusion). Specifically, as shown in FIG. 3(B), user information (reverse channel information) transmitted from the mobile terminal (MS) 100 to each of the base stations (BS1) 200 and (BS2) 300 is modulated based on the diffusing code specific to the mobile terminal (MS) 100. Similarly, user information (forward channel information) transmitted from each of the base stations (BS1) 200 and (BS2) 300 to the mobile terminal 100 is modulated based on the diffusing code specific to the mobile terminal (MS) 100.

Figure 4:
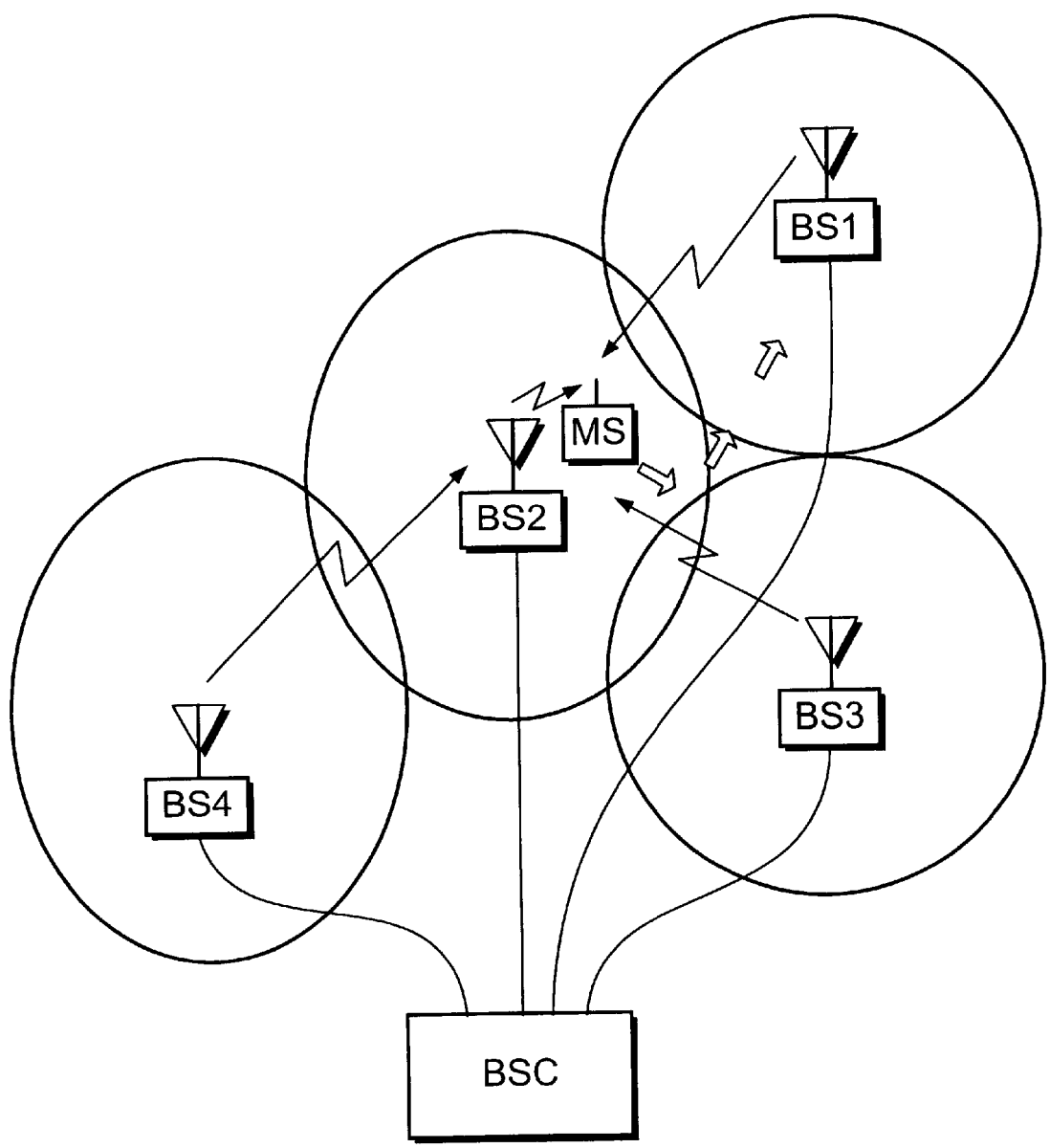
FIG. 4 is a block diagram illustrating a handover operation.

Described next by referring to FIGS. 4 and 5 is an operation performed at hand-over time when the mobile terminal is moved into a service area of a different base station. In the description below, the mobile terminal will be referred to as MS; the base station as BS; and the base station control equipment as BSC.

FIG. 4 is a block diagram showing a state where MS is located in the base station area of BS2, and BS1, BS3 and BS4 are located adjacently to BS2. In the drawing, it is assumed that MS is moving in an arrow direction. FIG. 5 is a sequence view showing a flow of processing performed by the network side device (BS, BSC or the like) and MS during a control operation for performing hand-over processing under the initiative of the mobile terminal.

MS engaged in communications with BS2 periodically receives radio signals emitted from adjacent BS1, BS3 and BS4 based on adjacent BS information contained in broadcast information received from BS2, measures a radio state between MS and each adjacent BS, and reports the radio state by transmitting a measuring result to BS2. BS2 reports the radio state by transmitting, to BSC, data representing the radio state between MS and each adjacent BS which has been transmitted from MS.

Upon having received the report of the radio state between MS and each adjacent BS from MS through BS2, BSC performs determination as to whether the radio state between MS and each BS is proper, in other words, whether a receiving level or the like of MS for receiving radio signals emitted from each BS is proper. Then, BS which has reached a predetermined receiving level and has been determined to be proper for starting communications is decided as a new BS candidate for communications. In this example, BS1 and BS3 are set as candidates.

BSC transmits, to BS1 and BS3 determined as proper candidates for starting communications, a diffusing code of each of reverse and forward channels specific to MS, which is currently used by MS for communications with BS2, and causes BS1 and BS3 to be active for MS.

Thus, each of BS1 and BS3 prepares a diffusing code of a reverse channel signal to be received from MS and a diffusing code of a forward channel signal to be transmitted to MS. On the other hand, in MS, the diffusing code specific to MS which is used in communications with BS2 is also used for communications with BS1 and BS3. Accordingly, MS is placed in a communicative state with BS1 and BS3 without performing any new control operations.

A dotted arrow line in FIG. 5 represents existence of a radio burst, and a communicative state of each of BS1, BS2 and BS3 with MS is shown. In this state, BSC is placed in a site diversity state, and for reverse channel signals, a best signal can obtained by selecting one from signals which are transmitted from each of BSs. Accordingly, the above state is now considered as one of characteristics of the CDMA communication system, which enables a good communication quality to be maintained.

From the communication state of MS through three BSs, the radio state between MS and each BS is changed following movement of MS, communications with BS for which a receiving level of MS takes a predetermined value improper for communications are sequentially cut off, and in the end, communications only with BS, within whose service area MS is newly located, are continued.

As described above, by using the diffusing code specific to the mobile terminal not only for the reverse channel but also for the forward channel, when the mobile terminal is moved between the base station areas, it is not necessary for the base station to specify a diffusing code for communications with a new base station for the mobile terminal. Accordingly the necessity of transmitting a message between the mobile terminal and the base station following switching of diffusing codes is eliminated, and especially a processing load on the mobile terminal can be reduced.

As apparent from the foregoing, with the mobile communication system and the mobile communication method of the present invention, a reverse channel for transmitting signals from the mobile terminal to the mobile communication network and a forward channel for transmitting signals from the mobile communication network to the mobile terminal can be specified by using a discrimination code specific to the mobile terminal. Accordingly, in the mobile terminal, even if a base station as a communication opponent is changed to another, it is only necessary to maintain the currently used traffic channel, and thus the necessity of message transmitting and receiving between the mobile terminal and the mobile communication network following channel switching can be eliminated and a load placed on the mobile terminal can be reduced.

The foregoing embodiment was described based on the case of performing communications in the CDMA multiplex communication system. But a technical field of the present invention should not be limited to this, and the invention can be applied to any of systems which specify reverse channel and forward channel radio signals by using a discrimination code specific to a mobile terminal. For example, in the case of a communication system which uses frequency hopping, reverse channel and forward channel radio signals may be specified by using a hopping pattern specific to a mobile terminal as a frequency hopping pattern.

What is claimed is:

1. A mobile communication system comprising:
   a mobile communication network; and
   a mobile terminal device which performs communications with said mobile communication network, said mobile communication network including a plurality of base stations and a base station control equipment by a code division multiple access (CDMA) system,
   wherein said mobile terminal comprises:
      a call connection requesting part for transmitting, through a predetermined control channel, a call connection request signal by adding specific information provided for said mobile terminal;
      a transmitting part for diffusing and modulating a transmitting signal of a reverse channel transmitted from said mobile terminal to each of said base stations based on a transmission diffusing code specified by said specific information provided for said mobile terminal; and
      a receiving part for oppositely-diffusing and demodulating a received signal of a forward channel transmitted from each of said base stations to said mobile terminal based on a receiving oppositely-diffusing code specified by said specific information provided for said mobile terminal; and
   wherein said mobile communication network further comprises:
      a translating part for translating said specific information provided for said mobile terminal, which is contained in said call connection request signal received through said control channel, and extracting a diffusing code used for each of said reverse channel and forward channel for said mobile terminal;
      a transmitting part for diffusing and modulating a transmitted signal based on said forward channel transmission diffusing code extracted by said translating part; and a receiving part for oppositely-diffusing and demodulating a received signal based on said reverse channel receiving oppositely-diffusing code extracted by said translating part.

2. A mobile communication system according to claim 1, wherein said mobile terminal further comprises a monitoring part for measuring, based on information regarding each of said base stations adjacent to one another, which is notified beforehand, a receiving level of radio signals emitted from each of said adjacent base stations, and then reporting said measured receiving level to said each of base stations, and wherein said mobile communication network further comprises a hand-over control part for notifying a base station of said oppositely-diffusing and diffusing codes for said reverse channel and forward channel for said mobile terminal, said base station being one where a receiving level of radio signals emitted from each of said adjacent base stations, which is reported from said mobile terminal, reaches a predetermined value, and then instructing starting of communications with said mobile terminal.

3. A mobile communication system according to claim 1, wherein said specific information comprises a unique equipment number provided for said mobile terminal.

4. A mobile communication method in which a mobile terminal performs communications with a mobile communication network including a plurality of base stations and a base station control equipment by a code division multiple access (CDMA) system, the method comprising:

in said mobile terminal,
  transmitting a call connection request signal through a predetermined control channel by adding specific information provided for said mobile terminal;
  diffusing and modulating a transmitted signal of a reverse channel going from said mobile terminal to each of said base stations based on a transmission diffusing code specified by said specific information provided for said mobile terminal;
  oppositely-diffusing and demodulating a received signal of a forward channel going from each of said base stations to said mobile terminal based on a receiving oppositely-diffusing code specified by said specific information provided for said mobile terminal;
  measuring, during communications, a receiving level of a radio signal emitted from each of said base stations adjacent to one another based on information regarding each of said adjacent base stations, which is notified beforehand; and
  reporting a result of said measuring to each of said base stations; and in said mobile communication network,
  translating said specific information provided for said mobile terminal, which is contained in said call connection request signal received through said control channel;
  extracting a diffusing code used for each of said reverse channel and forward channel for said mobile terminal;
  diffusing and modulating a transmitted signal based on said extracted forward channel transmission diffusing code;
  oppositely diffusing and demodulating a received signal based on said extracted reverse channel receiving oppositely-diffusing code;
  notifying a base station of said oppositely diffusing code for said reverse channel and said diffusing code for said forward channel for said mobile terminal, said base station being one where a receiving level of a radio signal emitted from each of said adjacent base stations, which is reported from said mobile terminal, reaches a predetermined value; and
  instructing starting of communications with said mobile terminal.

5. A mobile communication method according to claim 4, wherein said specific information comprises a unique equipment number provided for said mobile terminal.

6. A mobile terminal for a mobile communication system including a plurality of base stations and a base station control equipment, the mobile terminal comprising:

a call connection requesting part for transmitting a call connection request signal by adding specific information provided for said mobile terminal;

a transmitting part for diffusing and modulating a transmitting signal of a reverse channel transmitted from said mobile terminal to each of said plurality of base stations based on a transmission diffusing code specified by said specific information provided for said mobile terminal; and a receiving part for oppositely-diffusing and demodulating a received signal of a forward channel transmitted from each of said plurality of base stations to said mobile terminal based on a receiving oppositely-diffusing code specified by said specific information provided for said mobile terminal.

7. A mobile communication system, incorporating the mobile terminal of claim 6, further comprising:

a mobile communication network which communicates with said mobile terminal device, said mobile communication network comprising:

a translating part for translating said specific information provided for said mobile terminal, which is contained in said call connection request signal received through said control channel, and extracting a diffusing code used for each of said reverse channel and forward channel for said mobile terminal;

a transmitting part for diffusing and modulating a transmitted signal based on said forward channel transmission diffusing code extracted by said translating part; and a receiving part for oppositely-diffusing and demodulating a received signal based on said reverse channel receiving oppositely-diffusing code extracted by said translating part.

8. The mobile terminal, as claimed in claim 6, wherein said specific information comprises a unique equipment number provided for said mobile terminal.

9. A mobile communication network which communicates with a mobile terminal device, said mobile communication network comprising:

a translating part for translating a specific information provided for said mobile terminal device, where the specific information for is contained in a call connection request signal received through a control channel, and for extracting a diffusing code used for each of a reverse channel and a forward channel for said mobile terminal device;

a transmitting part for diffusing and modulating a transmitted signal based on said forward channel diffusing code extracted by said translating part; and a receiving part for oppositely-diffusing and demodulating a received signal based on said reverse channel receiving an oppositely-diffusing code extracted by said translating part.

10. A code division multiple access (CDMA) communication system comprising:

a mobile terminal which uses a diffusing code specific to said mobile terminal for both a reverse channel and a forward channel, wherein said diffusing code is determined based upon specific information provided for said mobile terminal.

11. The CDMA communication system according to claim 10, wherein said specific information comprises a unique equipment number provided for said mobile terminal.

12. A code division multiple access (CDMA) communication method for a communication system including a mobile terminal, said method comprising:

using a diffusing code specific to said mobile terminal for both a reverse channel and a forward channel.

13. The CDMA communication method according to claim 12, further comprising:

determining said diffusing code specific to said mobile terminal based upon specific information provided for said mobile terminal.

14. The CDMA method according to claim 13, wherein said specific information comprises a unique equipment number provided for said mobile terminal.

* * * * *